(12) United States Patent
Wu et al.

(10) Patent No.: US 7,583,179 B2
(45) Date of Patent: Sep. 1, 2009

(54) MULTI-PROTOCOL RADIO FREQUENCY IDENTIFICATION TRANSCEIVER

(75) Inventors: Jiangfeng Wu, Aliso Viejo, CA (US); Donald Edward Major, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 237 days.

(21) Appl. No.: 11/154,231

(22) Filed: Jun. 16, 2005

(65) Prior Publication Data

US 2006/0186995 A1 Aug. 24, 2006

Related U.S. Application Data

(60) Provisional application No. 60/655,175, filed on Feb. 22, 2005.

(51) Int. Cl.
*H04Q 5/22* (2006.01)
(52) U.S. Cl. ............... 340/10.1; 340/572.1; 340/10.3; 341/155; 375/316; 375/346
(58) Field of Classification Search ............... 340/10.1, 340/572.1, 572.4, 10.4; 375/329
See application file for complete search history.

(56) References Cited

U.S. PATENT DOCUMENTS

| | | | | |
|---|---|---|---|---|
| 4,339,819 | A * | 7/1982 | Jacobson | 714/734 |
| 4,517,519 | A * | 5/1985 | Mukaiyama | 329/303 |
| 4,625,332 | A * | 11/1986 | Singer et al. | 455/67.14 |
| 5,764,094 | A * | 6/1998 | Hatsuda | 327/333 |
| 6,501,807 | B1 * | 12/2002 | Chieu et al. | 375/329 |
| 6,650,258 | B1 * | 11/2003 | Kelly et al. | 341/61 |
| 2004/0085191 | A1 * | 5/2004 | Horwitz et al. | 340/10.3 |

OTHER PUBLICATIONS

Asad A. Abidi, CMOS Wireless Transceivers: The New Wave, IEEE Communications Magazine, Aug. 1999, pp. 119-124.*
"Wiegand Converters and Prox. Readers for OEMs"; RFIDeas Inc. http://www.rfideasstore.com/wiegconforoe.html; 2 pages.
"pcProx-USB Proximity Reader for HID/Motorola/Indala"; RFIDeas Inc. http://www.rfideasstore.com/pcproxproxre.html; 2 pages.
"pcProx-232 Proximity Reader for HID/Motorola/Indala"; RFIDeas Inc. http://www.rfideasstore.com/pcprreforhi.html; 2 pages.
"HID Proximity Readers for Kiosks & Doors"; RFIDeas Inc. http://www.rfideasstore.com/proxreadforf.html; 3 pages.

(Continued)

*Primary Examiner*—Brian A Zimmerman
*Assistant Examiner*—Yong Hang Jiang
(74) *Attorney, Agent, or Firm*—Garlick Harrison & Markison

(57) ABSTRACT

A transceiver for a RFID reader and a transceiver for a RFID transponder (tag) allow communication between the two devices. The RFID reader utilizes an analog front end and a digital backend. In the receiver portion of the transceiver, the front end of the RFID reader uses a pair of down-conversion mixers to demodulate a received signal into in-phase (I) and quadrature (Q) components and analog-to-digital converters (ADC) digitize the signal. A digital signal processor (DSP) in the back end processes the digital signal and uses a matched filter for data detection. The RFID tag receives an inductively coupled signal from the reader and the receiver portion of the tag uses a pulse/level detector that employs an analog comparator and a sample and hold circuit to detect the received signal. A digital decoder/controller is used to decode the incoming data and to establish a sampling clock for the pulse/level detector. An automatic gain control (AGC) circuit adjusts a receiver gain according to the received signal strength and controls tuning of magnetic coupling circuitry.

16 Claims, 12 Drawing Sheets

"KeeLoq Transponder Evaluation Kit"; Microchip Technology Inc.; 2 pages.

"Measuring Sensitivity of Transponder Coils"; Coilcraft Document 371-1; Coilcraft Inc.; Oct. 21, 2003; 2 pages.

"Measuring Self Resonant Frequency"; Coilcraft Document 363-1; Coilcraft Inc.; Sep. 16, 2003; 3 pages.

"Data Communication via The TMEB8704 Serial Interface RS-232"; Atmel Application Note; Atmel Corporation; 2004; 7 pages.

"Interface IC for 125kHz Wake-up Function"; Atmel ATA5283 Preliminary document; Atmel Corporation; 2004; 14 pages.

"RFID Application Kit TMEB8704", Atmel document; Atmel Corporation; 22 pages.

"Progressive field increase for the MLX90121"; Melexis Applicatin Note; Melexis Microelectronic Integrated Systems; Apr. 2004; 6 pages.

"A power booster for the MLX90121"; Melixis Application Note; Melexis Microelectronic Integrated Systems; Apr. 2004; 9 pages.

"MLX90121: Support of different modulation modes"; Melexis Application Note; Melexis Microelectronic Integrated Systems; Sep. 2004; 10 pages.

"A modulation index switch for the MLX90121"; Melexis Application Note; Melexis Microelectronic Integrated Systems; Apr. 2004; 4 pages.

"MLX90121 13.56MHz RFID Transceiver"; Melexis data sheet; Melexis Microelectronic Integrated Systems; Mar. 2004; 25 pages.

HF Reader Systems Series 6000, S6700 Multi Protocol Transceiver IC, RI-R6C-001A Reference Guide; Texas Instruments; Jun. 2002; 42 pages.

"125 kHz microID Passive RFID Device"; Microchip MCRF200 document; Microchip Technology Inc.; 2003; 24 pages.

"125 kHz Passive RFID Device with Sensor Input"; Microchip MCRF202 document; Microchip Technology Inc.; 2003; 20 pages.

"125 kHz microID Passive RFID Device with Anti-Collision", Microchip MCRF250 document; Microchip Technology Inc.; 2003; 24 pages.

"Passive RFID Basics"; Microchip AN680 document; Microchip Technology Inc.; 1998; 7 pages.

"Antenna Circuit Design for RFID Applications"; Microchip AN710 document; Microchip Technology Inc.; 2003; 50 pages.

"PICmicro Microcontroller Firmware Flow Chart of DV103006 Demo Reader for MCRF3XX and MCRF4XX Devices"; Microchip AN760 document; Microchip Technology Inc.; 2003; 16 pages.

"RFID Tag and COB Development Guide with Microchip's RFID Devices"; Microchip AN830 document; Microchip Technology Inc.; 2002; 26 pages.

"microID 125 kHz RFID System Design Guide"; Microchip document; Microchip Technology Inc.; Dec. 1998; 161 pages.

"microID 13.56 MHz RFID System Design Guide"; Microchip document; Microchip Technology Inc.; 2001; 164 pages.

* cited by examiner

MULTI-PROTOCOL RADIO FREQUENCY IDENTIFICATION TRANSCEIVER

CROSS REFERENCE TO RELATED APPLICATION

This application claims the benefit of priority to U.S. Provisional Patent Application Ser. No. 60/655,175; filed Feb. 22, 2005; and titled "Multi-Protocol Radio Frequency Identification Transceivers," which is incorporated herein by reference.

BACKGROUND OF THE INVENTION

1. Technical Field of the Invention

The embodiments of the invention relate to radio frequency identification (RFID) devices and more particularly to transceivers that are utilized in RFID readers and RFID transponders.

2. Description of Related Art

Radio frequency identification (RFID) devices are being utilized in greater quantity in a multitude of applications. One of the more common areas for RFID implementation is in product identification, whether for inventory or for sale. The bar code scanner technology is slowly being replaced by RFID technology. In the simplest of applications, a passive RFID transponder, commonly called a tag or a card, is placed on an object that is to be identified. A RFID reader is then used to obtain information from the tag. The reader typically has a transceiver to transmit and receive signals, as well as being powered by a power source. The tag also has a transceiver to receive the signal from the reader and to transmit a response back to the reader. However, the tag is generally passive and powered by the induced electromagnetic field.

The reader is powered and generates a magnetic field from its antenna. When the reader and the tag are within close proximity of each other, the reader generated magnetic field is induced into the tag. The tag uses this coupled energy to power its circuitry. The reader transmits an interrogating signal to the tag, and in response the tag transmits a signal back to the reader. In the example stated above, the tag may be placed on an item and the response from the tag may be to simply identify the item. For these simple applications, the reader and the tag operate using a single protocol that is defined for the reader-tag combination. The transceiver circuitry, especially the circuitry in the tag, is made simple to keep the cost low. Standards bodies, such as International Organization for Standardization (ISO) and International Electrotechnical Commission (IEC) set some of the standards and protocols for RFID communication.

However, as more complex applications are sought for the RFID technology, the existing RFID circuitry is limited in the amount and type of data that may be processed. For example, with certain communications security may be a paramount concern. If RFID devices are to be available for secure financial transactions or secure personal identification, more complex RFID devices may be needed to handle the type of data being transmitted. Furthermore, flexibility to allow reader-tag combinations to operate using different protocols may allow versatility in conducting a multitude of transactions. As more and more data are to be processed in RFID communications, it would also be advantageous to use a digital processor to process the data.

The described embodiments of the invention disclosed herein offer a RFID reader and RFID transponder which address some or all of these concerns, as well as others, to provide advantages over current RFID techniques.

SUMMARY OF THE INVENTION

The present invention is directed to apparatus and methods of operation that are further described in the following Brief Description of the Drawings, the Detailed Description of the Embodiments of the Invention, and the Claims. Other features and advantages related to the embodiments of the present invention will become apparent from the following detailed description of the embodiments of the invention made with reference to the accompanying drawings.

In one embodiment, a transceiver for a RFID reader and a transceiver for a RFID transponder (tag) allow communication between the two devices. Embodiments of the RFID reader utilize an analog front end and a digital backend. At least in the receiver portion of the transceiver, an analog-to-digital converter (ADC) unit converts a received analog signal into digital data. The digital data is then processed by a digital signal processor (DSP) in the digital backend. In one embodiment of the receiver, a pair of down-conversion mixers are used to demodulate the received signal into in-phase (I) and quadrature (Q) components and a digital signal processor in the back end processes the received data.

In one embodiment, the RFID tag utilizes an analog front end to receive the inductively coupled signal from the reader and the receiver portion of the tag uses a pulse/level detector that employs an analog comparator and an analog sample-and-hold circuit to detect the received signal. A digital decoder is used to decode the incoming data from the received signal. A digital controller is used to establish the sampling clock for the detector circuit. An automatic gain control (AGC) circuit adjusts the receiver gain according to the signal strength, as well as controlling tuning of the magnetic coupling circuitry.

DETAILED DESCRIPTION OF THE EMBODIMENTS OF THE INVENTION

The embodiments of the present invention may be practiced in a variety of settings that implement a radio frequency identification (RFID) transceiver, either in a reader or in a tag, or in both. In one described embodiment, a RFID transceiver is implemented in a reader that incorporates an analog front end and a digital backend. One embodiment of the reader uses a down-conversion mixer, an analog-to-digital converter (ADC) and a digital-signal-processor (DSP). In another described embodiment, a RFID transceiver is implemented in a tag that also may incorporate an analog front end and digital processing. One embodiment of the tag uses pulse/level detection based on adaptive threshold control using a sample and hold circuit and an automatic gain control (AGC) circuit to adjust to the strength of the received signal. It is to be noted that the below described embodiments are just some of the embodiments available to practice the invention and that other embodiments may be readily implemented without departing from the spirit and scope of the invention.

Figure 1:
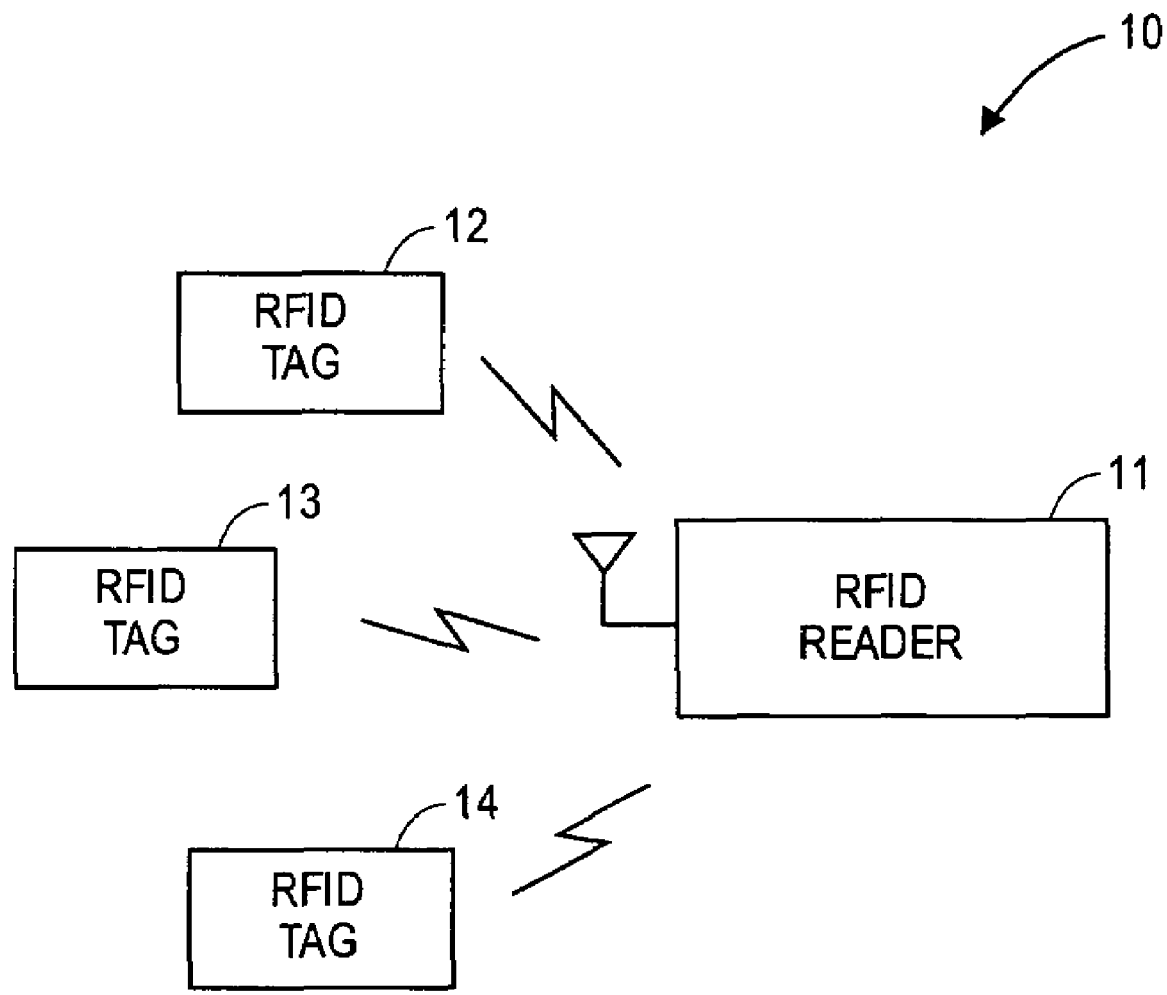
FIG. 1 is a block diagram showing one example embodiment of a system employing a RFID reader to communicate with a plurality of RFID transponders or tags.

FIG. 1 shows a system 10 comprised of a RFID reader 11 and at least one RFID tag. In the example of FIG. 1, three RFID tags 12-14 are shown. The actual number of such tags may vary from system to system. Additionally, tags (such as tags 12-14) operating within system 10 may be identical tags or they may be of different types. As noted later in the description, tags 12-14 may operate using the same or similar protocol, or they may operate using different protocols. Generally, tags 12-14 activate when they are within a certain proximity to RFID reader 11 to communicate with reader 11. The actual distance over which a particular tag remains active varies from system to system and the design of reader 11 and tags 12-14. The communication between reader 11 and tags 12-14 is typically achieved by inductive coupling between the coils (antennas) of reader 11 and the particular tag. However, it is to be noted that other forms of communication may be utilized.

As an example, reader 11 and/or tags 12-14 of system 10 may support all or some options of ISO/IEC 14443, 15693 and 18000-3 standards of 13.56 MHz high frequency (HF) RFID interface, all or some options of ECMA-340 13.56 MHz Near Field Communication (NFC) interface, and all or some options of ISO/IEC 18000-2 standard and other variations of 100-150 kHz low frequency (LF) RFID interfaces. In other embodiments, system 10 may operate utilizing other RFID standards at other frequencies, such as ISO/IEC 18000-4 standard of 2.45 GHz ultra high frequency (UHF) RFID interface, ISO/IEC 18000-6 standard of 860-960 MHz UHF RFID interface, and ISO/IEC 18000-7 standard of 433 MHz UHF RFID interface. In most applications reader 11 has its own power supply or it may obtain power from a coupled source. The tag may have its own power supply, but in many RFID applications, the tag is passive and obtains power from the signal transmitted by reader 11, when the tag is in proximity to reader 11. Thus, in some embodiments for system 10, reader 11 provides power to tags 12-14, by generating an alternating magnetic field. For the standards noted above, reader 11 may generate the alternating magnetic field at 13.56 MHz (HF) or 100-150 kHz (LF). In other embodiments, separate power sources may be available to provide the power to a tag.

For general applications, reader 11 transmits data to tags 12-14 by changing the magnitude of its transmitting power. Tags 12-14 receive the transmitted signal and process the received data. The activated tags 12-14 then reply by transmitting data to reader 11. A typical technique is to use load modulation, in which the tag varies the load impedance of its coil to change its resonant frequency and its quality factor Q. This action causes a voltage variation at the reader antenna. Accordingly, for a typical RFID application, reader 11 performs three functions: providing power to tags 12-14, transmitting data and receiving data from tags 12-14.

Although reader 11 and tags 12-14 may incorporate RFID features known in the art, embodiments described below disclose novel techniques to receive and process transmitted signals, both for reader 11 and tags 12-14. Although not shown in FIG. 1, reader 11 is typically coupled to another device, host, network or system for data transfer. Such coupling to reader 11 may be hard-wired or wireless. Furthermore, tags 12-14 are generally isolated units, except for the inductive coupling to reader 11. However, one or more tags may be coupled to other devices, hosts, networks or systems, as well.

RFID Reader Transceiver

Figure 2:
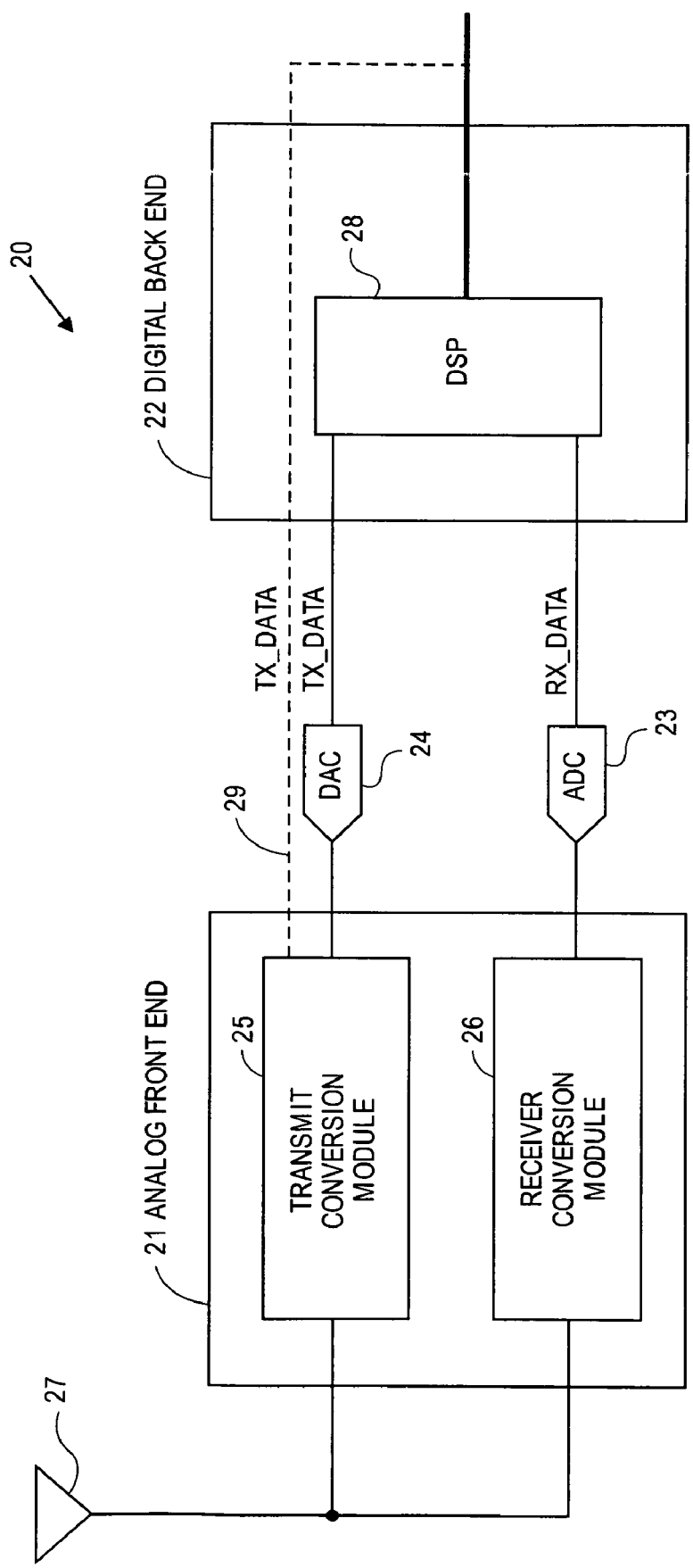
FIG. 2 is a block schematic diagram of an embodiment of a RFID reader that incorporates an analog front end and a digital back end, in which the digital back end includes a digital signal processor.

FIG. 2 shows one embodiment for implementing reader 11 of FIG. 1. The particular example in FIG. 2 is a reader 20, comprised of an analog front end 21, a digital back end 22, an analog-to-digital converter (ADC) 23 and an digital-to-analog converter 24. Although ADC 23 and DAC 24 are shown between the front end 21 and back end 22, either or both may be incorporated within front end 21 or back end 22. ADC 23 converts received analog signal to digital data RX_DATA, while DAC 24 converts digital data TX_DATA to transmit analog signal for transmission from reader 20. In some embodiments, DAC 24 may not be present.

Analog front end 21 includes a transmit conversion module 25 to convert the analog version of the TX_DATA for transmission from an antenna 27 at a selected transmission frequency. Conversion module 25 typically performs some form of signal conversion, such as encoding and modulation, to generate the outbound signal that includes intelligence of the TX_DATA, to be transmitted from reader 20. Analog front end 21 also includes a receiver conversion module 26 to receive incoming signal and convert the received signal by performing some form of conversion, such as demodulation and detection. The captured analog signal is then provided as output from conversion module 26 to ADC 23 for conversion to digital data RX_DATA.

Digital back end 22 includes a processing device to process digital data. In the particular embodiment shown a digital signal processor (DSP) 28 is included in digital back end 22 to perform signal processing of the received RX_DATA. DSP 28 may also be utilized to perform processing to generate the outbound TX_DATA as well. Furthermore, although not shown, digital backend 22 may include other circuits and devices, such as a host processor, memory and/or interface, to work in conjunction with DSP 22. Additionally, reader 20 may be integrated onto a single integrated circuit chip and may be fabricated using Complementary Metal-Oxide Semiconductor (CMOS) technology. Alternatively, the various units of reader 20 may be separated into more than one chip.

In another embodiment for reader 20, DSP 28 processes only the inbound signal RX_DATA and does not process the outbound data. The outbound TX_DATA bypasses DSP 28 and is input to transmit conversion module 25, as shown by dashed-line 29. This alternative approach allows the digital TX_DATA to be fed directly to conversion module 25 without the added requirement of DSP processing. In that instance, DSP 28 is used for processing the received signal only. Although not shown, it is to be noted that other embodiments may utilize DSP 28 for processing of outbound data TX_DATA and bypassed for the inbound RX_DATA.

A large range of operation may be accomplished for reader 20 by using a sufficiently large reader antenna for antenna 27 and by using sufficiently high voltage to drive antenna 27. An AC voltage greater than approximately 10 V may be required to achieve a minimum range of operation for many applications. Since this voltage may exceed the break-down voltage of submicron CMOS transistors, off-chip components may be needed for sufficient power transmission, if reader 20 is integrated onto a single CMOS chip. However, by using CMOS integrated circuits for reader 20, various operations may be performed at low voltage (under approximately 3.3V). For example, low-voltage CMOS integrated circuits are capable of controlling data transmission, performing demodulation, signal processing and data decoding for data reception, and providing high-level functions such as transmission protocols and anti-collision with a minimum set of external components. Accordingly, these operations may be performed by a CMOS manufactured reader 20. The presence of DSP 28 allows a substantial part of the signal processing to be performed in the digital domain with more sophisticated algorithms, which may lead to improved receiver (as well as transmitter) performance and increased range. DSP 28 also allows programmability to be provided to data transmission and/or data reception, which may allow for a single RFID device to support multiple RFID protocols. The requirements of different protocols may now be programmed by software, instead of having dedicated hardwired circuitry.

Figure 3:
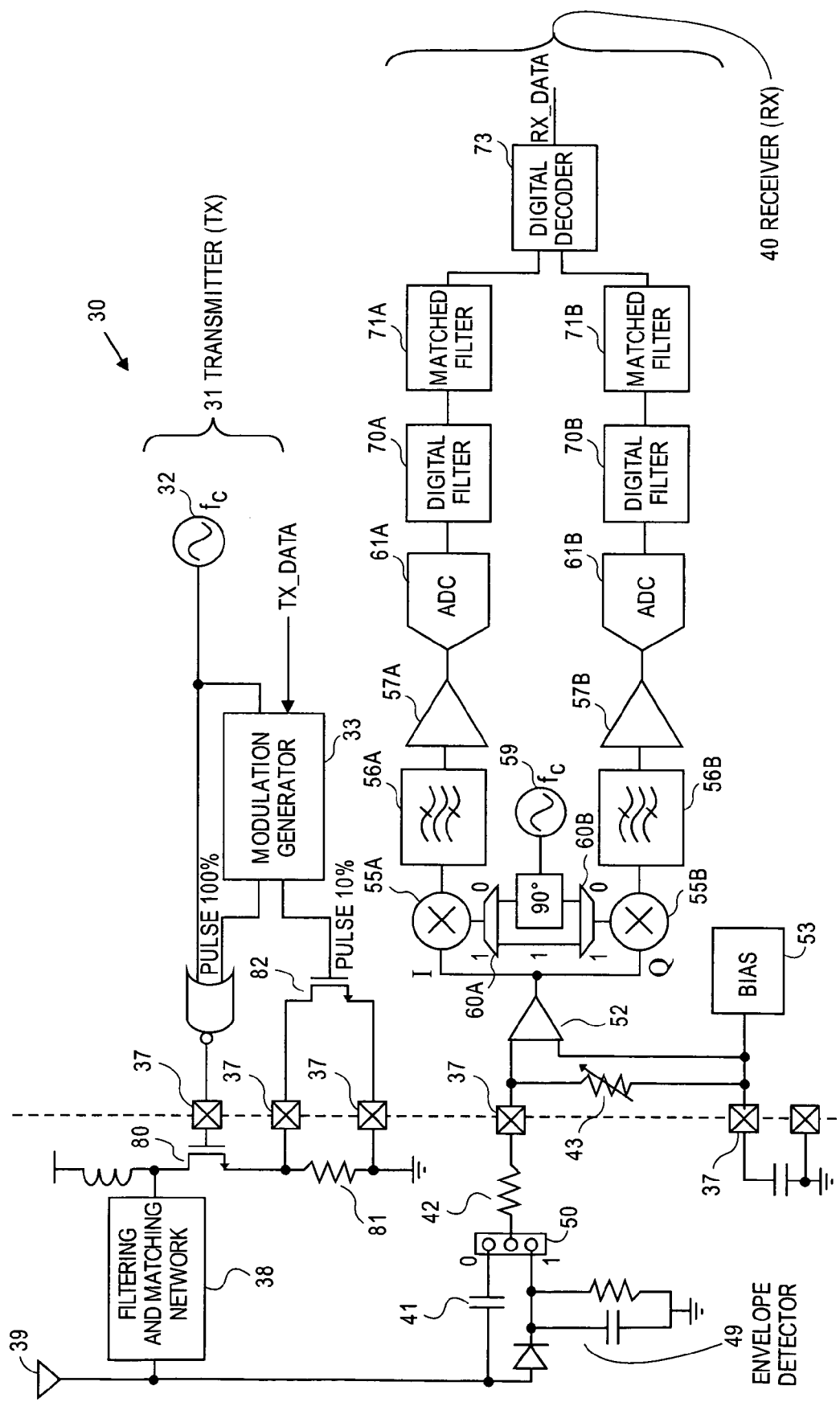
FIG. 3 is a block schematic diagram of another embodiment of an RFID reader that uses an analog front end and a digital back end to process received signals.

FIG. 3 shows another embodiment of a reader 30, which may be implemented using CMOS integrated circuits. Reader 30 may be implemented as reader 11 of FIG. 1, as well as incorporated in reader 20 of FIG. 2. Reader 30 comprises a transmitter (TX) unit 31 and a receiver (RX) unit 40. Thus, reader 30 shows a base transceiver architecture for implementing a RFID reader.

The data transmission and higher-level functions may follow an established standard, such as ISO/IEC 14443, 15693 and 18000. As noted in FIG. 3, TX unit 31 comprises a local oscillator (LO) 32 that generates a local oscillator signal, which is usually at the carrier frequency $f_c$, to be modulated by TX_DATA in modulation generator 33. In a typical RFID application, a RFID reader may use two modulation schemes; 100% amplitude shift keying (ASK) and 10% ASK. The 100% ASK completely shuts off the signal during negative pulses. The 10% ASK is a low-index ASK method that lowers the signal amplitude by approximately 8-30% in practice during negative pulses. As shown in FIG. 3, the 100% ASK is realized by gate modulation of a transmitter transistor 80, which is controlled by digital signal PULSE 100%. The 10% ASK is realized by source impedance modulation using a source degeneration resistor 81 across transistor 82, which is controlled by digital signal PULSE 10%. Resistor 81 may be either on-chip or external to the chip, and may be programmable to control the modulation index.

The output from TX unit 31 is coupled to antenna 39 through a filtering and matching network 38. The radiated signal is then transmitted from antenna 39 to communicate with various tags. For the example embodiment shown in FIG. 3, chip pads (terminals) 37 indicate the boundary of the CMOS chip and those components shown to the left of the pads 37 are located external to the chip. However, in other embodiments, some or all of these external components may reside within the chip. It is to be noted that a variety of circuits may be implemented for TX unit 31 to modulate TX_DATA and transmit an outbound signal from reader 30.

On the receive side, an inbound signal at antenna 39 is coupled through an AC coupling capacitor 41. In some applications, a voltage variation due to tag load modulation may be less than 10 mV and rides on top of a large transmitted carrier signal that may be in excess of approximately 10 Vp-p (peak to peak). Accordingly, an attenuator may be utilized to attenuate the incoming signal. In the example, the analog front end of RX unit 40 uses an external resistor 42 and an on-chip resistor 43 to reduce the high antenna voltage to a CMOS-compatible voltage level, which may be smaller than 3.3 V. One or both resistors 42, 43 may be made variable (as well as programmable) to adjust the attenuation provided by the voltage division. In the particular example, resistor 42 is fixed and resistor 43 is variable and programmable. In some embodiment, one or both resistors 42, 43 may be programmable, so that attenuation factors may be adjusted programmably. The attenuation at the RX unit input protects the CMOS circuit transistors from being subjected to a high gate voltage which exceeds the gate oxide break-down voltage of a CMOS transistor.

As will be described below, received signal detection is generally provided by synchronous demodulation by a down-conversion mixer. However, if envelope detection is desired, an envelope detector 49 may be utilized externally to perform the signal detection. In one embodiment, terminal 50 allows selection of inputs ("0" or "1") to the input attenuator. The "0" select state selects direct AC coupling of the antenna signal through coupling capacitor 41. The "1" select state selects the detected signal from the output of envelope detector 49. The selection may be made programmably.

The envelope detection is generally not needed (and in certain instances, not desired) with the various embodiments described below that use a mixer for demodulation. However, the selectability at terminal 50 allows an option of using an envelope detector instead and forgoes the use of the demodulation techniques described below.

Figure 4:
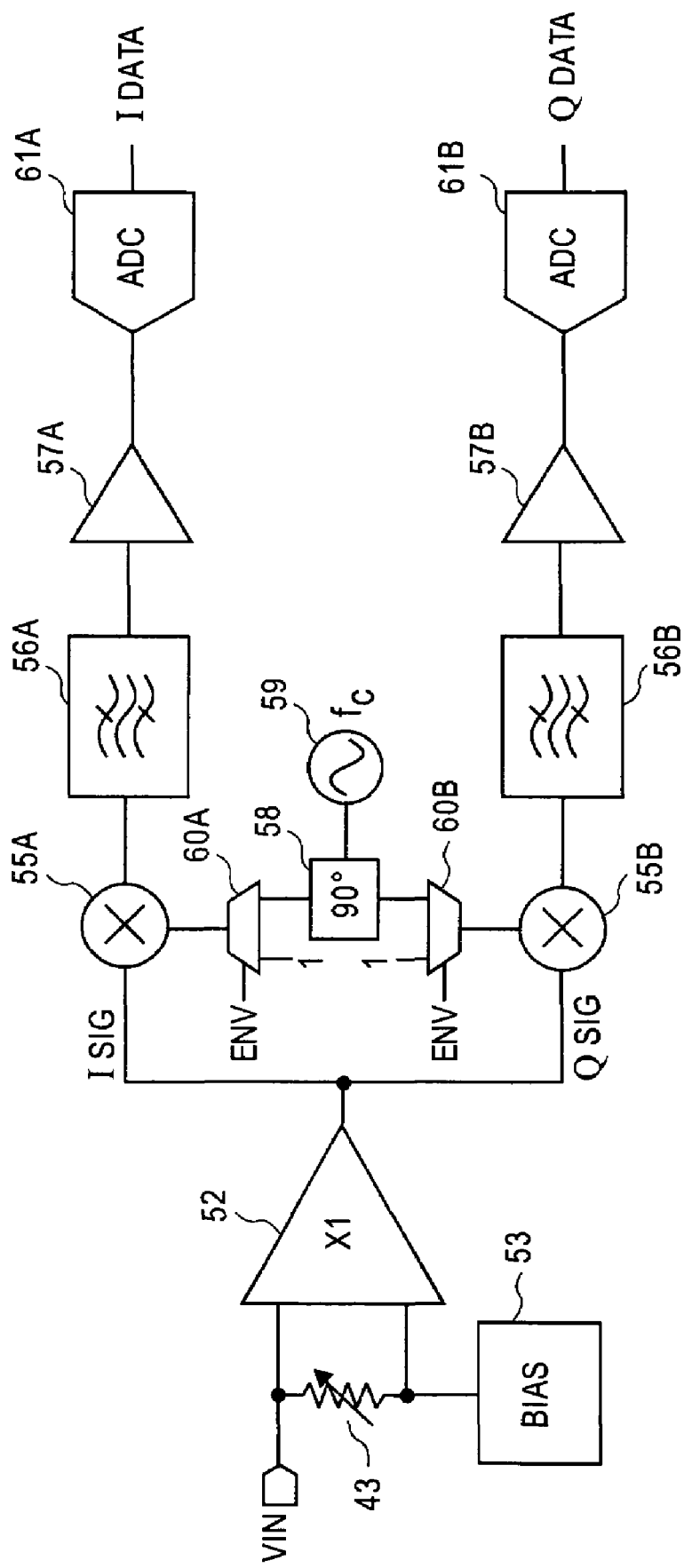
FIG. 4 is a block schematic diagram showing details of an embodiment for the analog front end for the receiver section of the RFID reader of FIG. 3.

The analog front end of RX unit 40 is shown in more detail in FIG. 4. The analog front end uses a direct conversion architecture. Thus, referring to FIGS. 3 and 4, the analog front end of RX unit 40 includes an input buffer 52 biased by a bias circuit 53. An in-phase/quadrature (I/Q) demodulator with a pair of down-conversion mixers demodulates both amplitude-modulated (AM) and phase-modulated (PM) signals and improves the signal-to-noise (SNR), because load modulation creates both AM and PM components. At the output of buffer 52, in-phase component (I) and quadrature component (Q) paths are separated and each component path is traced through corresponding mixers 55A-B, filters 56A-B and amplifiers 57A-B. A local oscillator 59 generates a local oscillator frequency, which again is usually the carrier frequency $f_c$, and a phase shifting circuit 58 provides the 90 degree phase shift between the two local oscillator signals coupled to mixers 55A-B to generate the I and Q signals at the output of the mixers 55A-B. In some embodiments, LO 32 and LO 59 may be one and the same.

Multiplexers 60A-B may be included in some embodiments that utilize the option of selecting between the "0" and "1" select states noted above. Thus, in the "0" select state, when direct AC coupling of the received signal is input to RX unit 40, the local oscillator signal is used to demodulate the signal. If the external envelope detector option is present and envelope detector 49 is utilized, then selecting the "1" select state removes the local oscillator signal, so that demodulators are bypassed.

Subsequently, filters 56A-B remove the dominant direct current (DC) component due to the unblocked transmit signal and filters out the high-frequency noise and interference. In one embodiment, a high-order band-pass filter (BPF) approximately between 100 kHz and 1 MHz is used to remove the DC component in each of the I/Q paths. The filtered signal is then amplified by amplifiers 57A-B and digitized by corresponding ADC 61A-B. In one embodiment, amplifiers 57A-B are programmable gain amplifiers (PGAs), in which the gain of the amplifiers may be programmably adjusted.

It is to be noted that the demodulator comprising of mixers 55A-B, BPF and PGA may be implemented by switched capacitor circuits that may be clocked at two times (2×) the carrier frequency $f_c$. In some embodiments, BPF and the PGA may be combined into one single block with both frequency selectivity and gain. One advantage of the switched-capacitor implementation is that the filter frequency response and the gain may be set precisely because both are determined by the capacitor ratio, which is very accurately controlled in CMOS processes. Furthermore, in one embodiment, buffer 52 provides single-ended to differential conversion, so that the analog front end operates differentially in processing the received signal.

ADCs 61 A-B digitize the outputs from the analog front end and couple the digital I and Q data to the digital back end. Generally, for most embodiments, ADCs are oversampled at 2× the carrier frequency to achieve high narrow-band dynamic range and high narrow-band effective number of bits (ENOB) using low-resolution low-cost ADC circuits. The large dynamic range provided by the oversampled ADCs may avoid the use of automatic gain control circuitry, which may cause problems in an environment with multiple tags.

Figure 5:
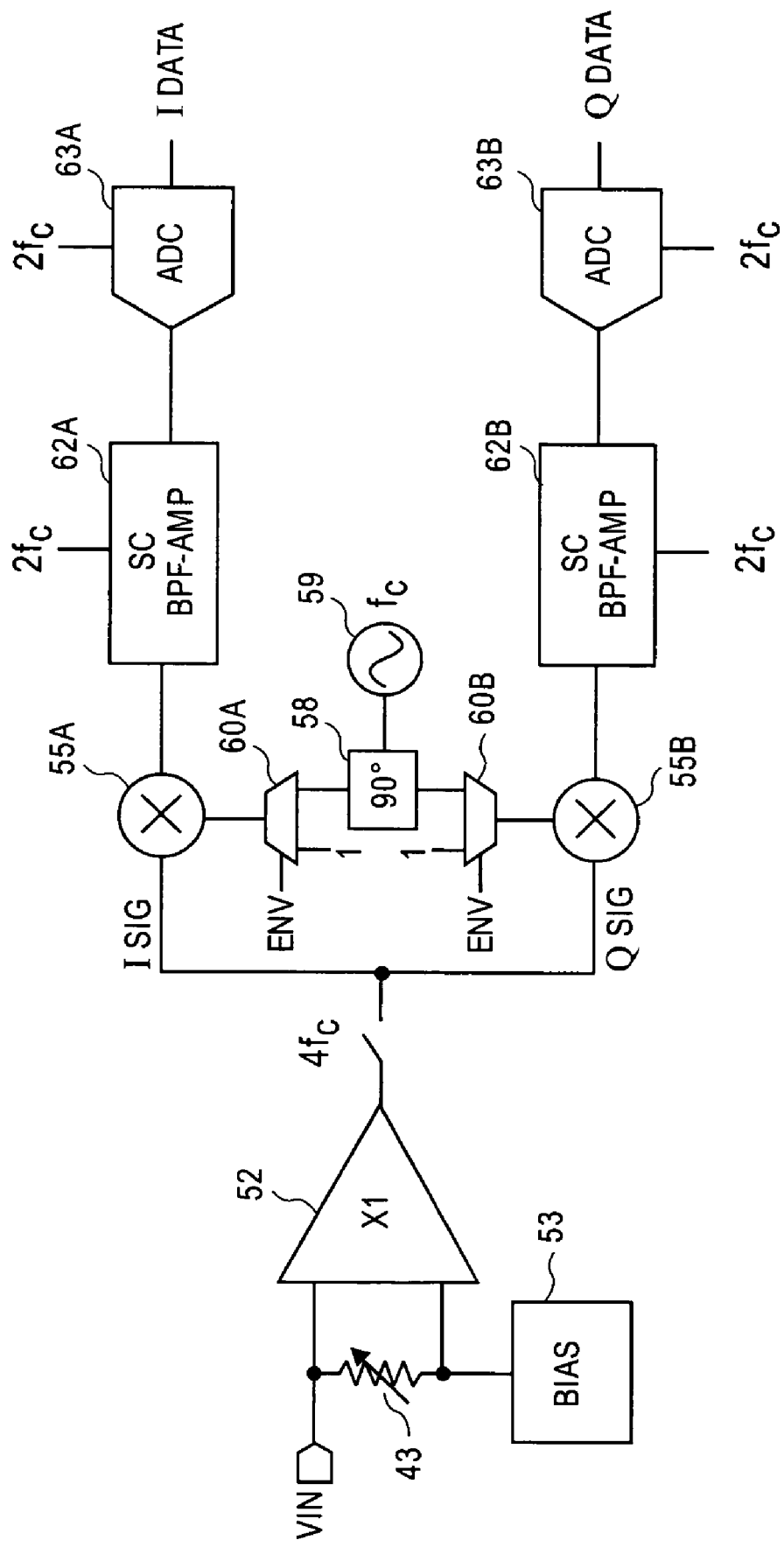
FIG. 5 is a block schematic diagram of another embodiment of the analog front end for the receiver section of the RFID reader of FIG. 3.

In FIG. 5, an embodiment of an analog front end using the switched capacitor technique is illustrated. At the output of buffer 52, the signal is sampled at 4× the carrier frequency to obtain all four phases for I/Q demodulation. The I path processes the signal at the even phase and the Q path processes the signal at the odd phase. Both are clocked at approximately 2× the carrier frequency. On the I and Q signal paths, the signals are down-converted by corresponding switched capacitor mixers 55A-B, which have substantial linearity. The signals are then sent to corresponding switched capacitor filter and amplifier units (BPF-AMP) 62A-B that provide band-pass filtering to eliminate the large DC component and the high-frequency noise, as well as providing sufficient gain to suppress the offset and quantization error of ADCs 63A-B.

Bandpass filter-amplifier (BPF-AMP) units 62A-B and ADCs 63A-B are both oversampled at 2× the carrier frequency. Since the typical signal bandwidth specified in ISO 14443 and ISO 15693 standards is 100 kHz or less, the $2f_c$ sampling provides a sufficient oversampling ratio to improve receiver sensitivity. Furthermore, the receiver analog front end may be set for both 13.56 MHz (HF) and 100-150 kHz (LF) operations by simply changing the clock frequency. Thus, switched capacitor circuitry may be utilized in the analog front end for some of the embodiments which practice the invention.

It is to be noted that various alternative embodiments for the analog front end may be implemented. For example, for the circuit shown in FIG. 5, the I and Q component outputs from BPF-AMP units 62A-B may be coupled through an analog multiplexer into a single ADC. The analog multiplexer selects either the I or Q component output from BPF-AMP units 62A-B for input into the ADC. The ADC may be operated at 4× the carrier frequency to digitize the I and Q signals alternately.

In another embodiment, the single or dual ADC design described above may use delta-sigma ($\Delta\Sigma$) ADC(s) to digitize the signals. In addition to oversampling, the $\Delta\Sigma$ ADC uses noise shaping to improve narrow-band dynamic range and ENOB with a low-resolution quantizer. The use of $\Delta\Sigma$ ADC may relax the filtering and gain requirements for low-data-rate signals that may result in savings in power and area on the chip.

In another embodiment, the analog front end may use a band-pass $\Delta\Sigma$ ADC after the $4f_c$ sampling of the output of buffer 52A in FIG. 5. The band-pass $\Delta\Sigma$ ADC may directly digitize the received signal without filtering or amplification. Then, a digital I/Q demodulator generates the I/Q data. This approach may be implemented with fewer analog circuit blocks, but without filtering, the band-pass $\Delta\Sigma$ ADC may have a stringent requirement of 80-100 dB dynamic range or 14+ ENOB, due to the large difference between the transmitted signal level and the minimum received signal level. For HF RFID specified in ISO 1443/15693, to achieve this performance at 13.56 MHz may require high power consumption. This approach may be more desirable for LF RFID applications.

After the ADC units 61 A-B (or 63A-B), the I data and the Q data are in digital form. The I and Q data are then coupled to the digital back end of RX unit 40. FIG. 3 shows the digital back end comprised of digital filters 70A-B, matched filters 71A-B and digital decoder 73. Digital filters 70A-B generally provide low-pass and/or band-pass filtering. Matched filters 71A-B compute the correlations between the incoming signal and ideal data patterns. Digital decoder 73 uses the correlation to provide the RX_DATA output. It is to be noted that a variety of digital back ends may be implemented to provide filtering and decoding operations. Furthermore, these functions may be readily provided by a DSP, as was noted in the example of FIG. 2.

Figure 6:
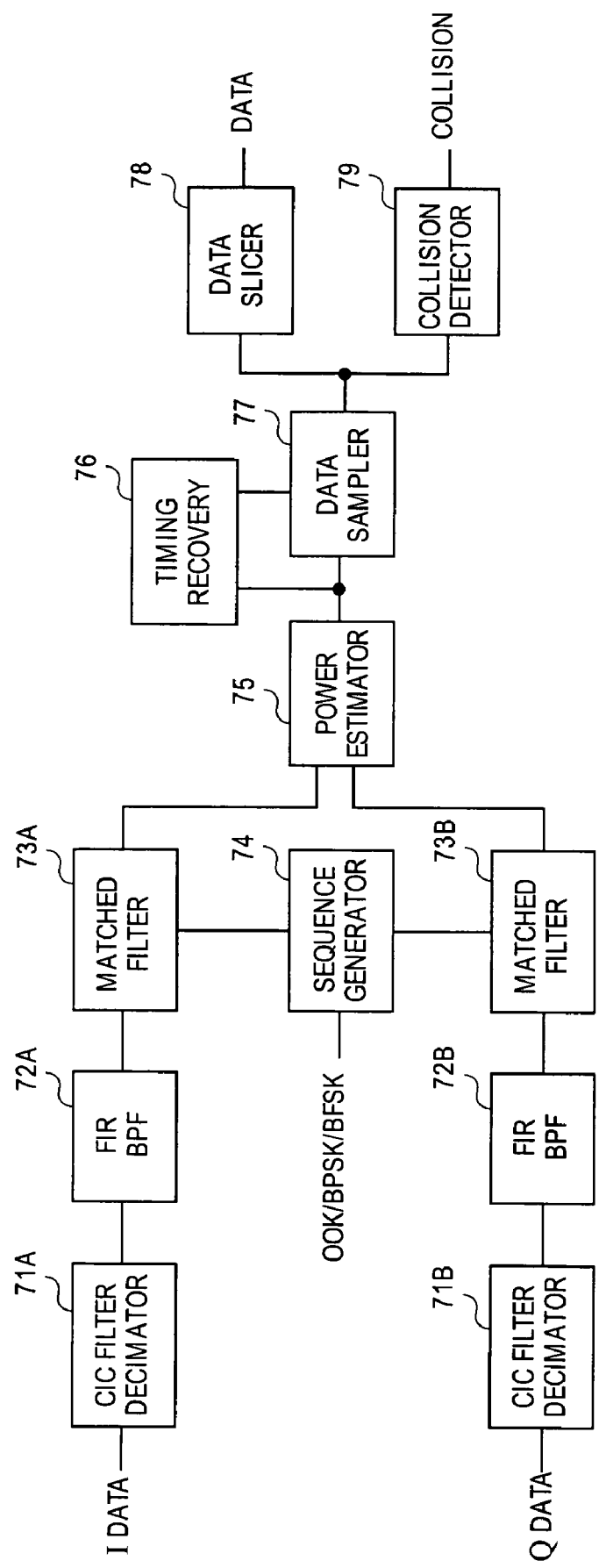
FIG. 6 is a block schematic diagram showing details of one embodiment for the digital back end of the receiver section for the RFID reader of FIG. 3.

In FIG. 6, a more detailed digital back end is shown. The digital back end may be implemented as a DSP. On each of the I and Q paths, a corresponding cascaded integrator-comb (CIC) filter decimator 71 A-B provides low-pass filtering on the oversampled data stream and the data is decimated to a lower sampling frequency. A narrow-band finite impulse response (FIR) band-pass filter (BPF), noted as FIR BPF 72A-B, eliminates noise and interference outside the signal bandwidth. Since RFID protocols use multiple sub-carrier pulses to represent one data symbol, RX unit 40 takes advantage of this fact by using corresponding matched filters 73A-B in data detection. Matched filters 73A-B compute the correlations between incoming signals and ideal signal patterns, with use of a sequence generator 74. As noted, sequence generator 74 may be programmed to handle a variety of communication protocols, for example, OOK, BPSK, and BFSK modulation schemes at various sub-carrier frequencies.

The I and Q correlations are sent to a power estimator unit 75, which measures the correlations, and subsequently to a data sampler 77. A data slicer 78 then uses the power estimation of the correlations to determine which data is received. If a clear decision cannot be made when the signal level is high, a collision detector 79 reports a collision. A collision condition may exist when multiple tags send different data simultaneously. A timing recovery unit 76 may be needed to sample the power estimator outputs at the correct time, in an oversampled data stream, for data slicer 78 to make correct decisions.

It is to be noted that the matched filter detector is an optimal detector that may achieve low bit error rate (BER) under a low signal-to-noise ratio. The precise narrow-band filtering and matched filter detection improve the performance of RX unit 40, which leads to increased range and capacity. This performance improvement is made possible by the use of digital signal processing.

As noted in the description above, a variety of embodiments may be readily available to provide a RFID reader that incorporates a transceiver, in which a receiver portion of the reader utilizes an analog front end, an ADC for conversion and a digital back end. In one example, the analog front end utilizes down-conversion mixers for synchronous demodulation of the received signal and the digital back end utilizes matched filters for optimal data detection.

RFID Transponder (Tag) Transceiver

A passive RFID transponder, also referred to as a RFID tag or RFID card, usually performs three functions. Generating power from a coupled magnetic field (if an on-board power supply is not available), receiving data from a RFID reader (such as the various embodiments described above) and transmitting a reply signal (usually data) to the reader.

Embodiments for a tag, such as tag 12-14, for use in communication with a reader, are described below. Again, power may be derived from the coupled magnetic field or power may be provided using wired connections. Thus, as long as power is available to operate the tag, the method of power generation is not critical to understanding the operation of the embodiments described below.

Figure 7:
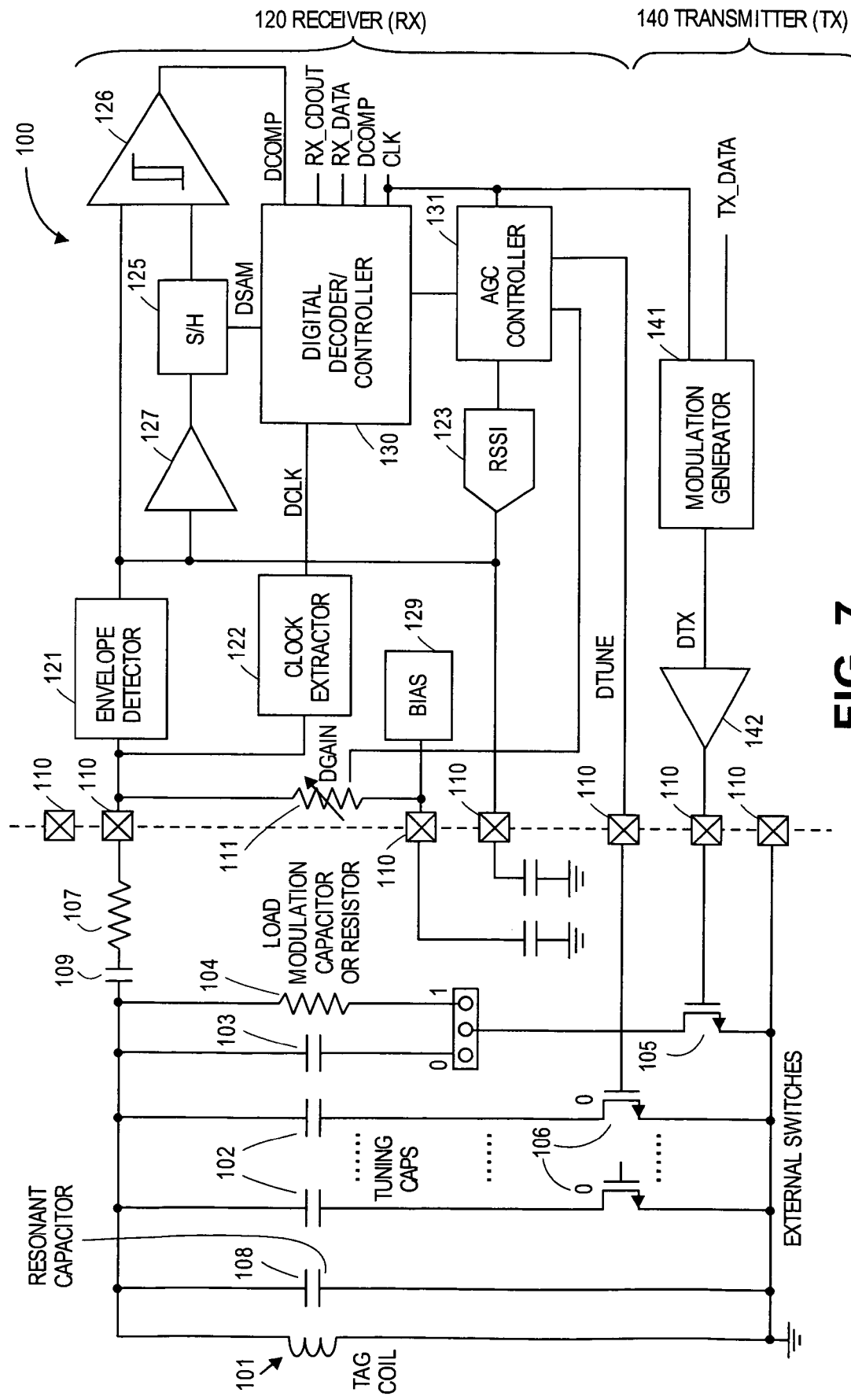
FIG. 7 is a block schematic diagram of an embodiment of an RFID transponder that incorporates an analog front end and digital processing to detect received signals, as well as controlling the gain of a receiver.

When a tag is in proximity to a reader, inductive coupling of the magnetic field between the reader antenna and a coil in the tag occurs. The AC voltage across a tag coil may be greater than approximately 40Vp-p, which exceeds the oxide breakdown voltage of most CMOs transistors. Accordingly, as shown in FIG. 7, a RFID tag 100 uses an external tag coil 101 and a resonant capacitor 108. In some embodiments, a set of tuning capacitors 102 may also be used. These components, as well as others that are located to the left of pads (terminals) 110, are generally placed external to a CMOS integrated circuit chip. Blocks shown to the right of pads 110 are generally on-chip components of a CMOS integrated circuit chip. Therefore, those components typically operating at higher voltages reside off-chip, while components that operate using CMOS compatible voltages may reside on-chip. The use of low-voltage CMOS integrated circuits allows the digital control of data transmission and data decoding, where such capabilities may be programmable. Programmability in a tag enables a single RFID tag to support multiple RFID protocols.

FIG. 7 shows the overall tag transceiver architecture for RFID tag 100. Due to an expected high coil voltage, coil 101, resonant capacitor 108, tuning capacitors 102, load modulation capacitor 103 and/or load modulation resistor 104, load modulation transistor 105, tuning selector transistors 106 to activate various tuning capacitors 102, AC coupling capacitor 109, and attenuation resistor 107, reside externally off-chip. Thus, the antenna circuit of RFID tag 100 typically resides off-chip. However, it is possible in other embodiments that some or all of these components may reside on-chip, if the encountered voltages are not harmful to the integrated circuit chip. In addition, even though MOS field effect transistors (FET) are shown in FIG. 7 for modulation and tuning, other types of controlled switching devices, such as bipolar junction transistors (BJT), may be used instead.

An attenuator comprised of an external resistor 107 and an on-chip resistor 111 reduces the high coil voltage to a CMOS-compatible voltage level before the incoming signal enters a receiver (RX) unit 120. One or both resistors 107, 111 may be made variable and one or both resistors 107, 111 may be made programmable. In the particular example shown, resistor 107 is fixed and resistor 111 is variable and programmable. A bias circuit 129 may be employed to set the input DC bias. Under strong inductive coupling, a large attenuation may be needed before the signal may be brought on-chip. For tags that abide by the ISO/IEC 10373-6/7 standard, the coil voltage at the tag may vary by approximately 40 dB. Therefore, automatic gain control (AGC), which adjusts the receiver gain according to the signal strength, may be necessary to prevent signal saturation when the coupling is strong and to avoid requiring extreme accuracy on detector circuits when the coupling is weak. For tag 100, the AGC adjusts the on-chip programmable resistor 111 to change the attenuation factor of the attenuator comprised of resistors 107 and 111. The AGC may also be utilized to control transistors 106 in order to control coil tuning, which affects the strength of the input signal.

Figure 8:
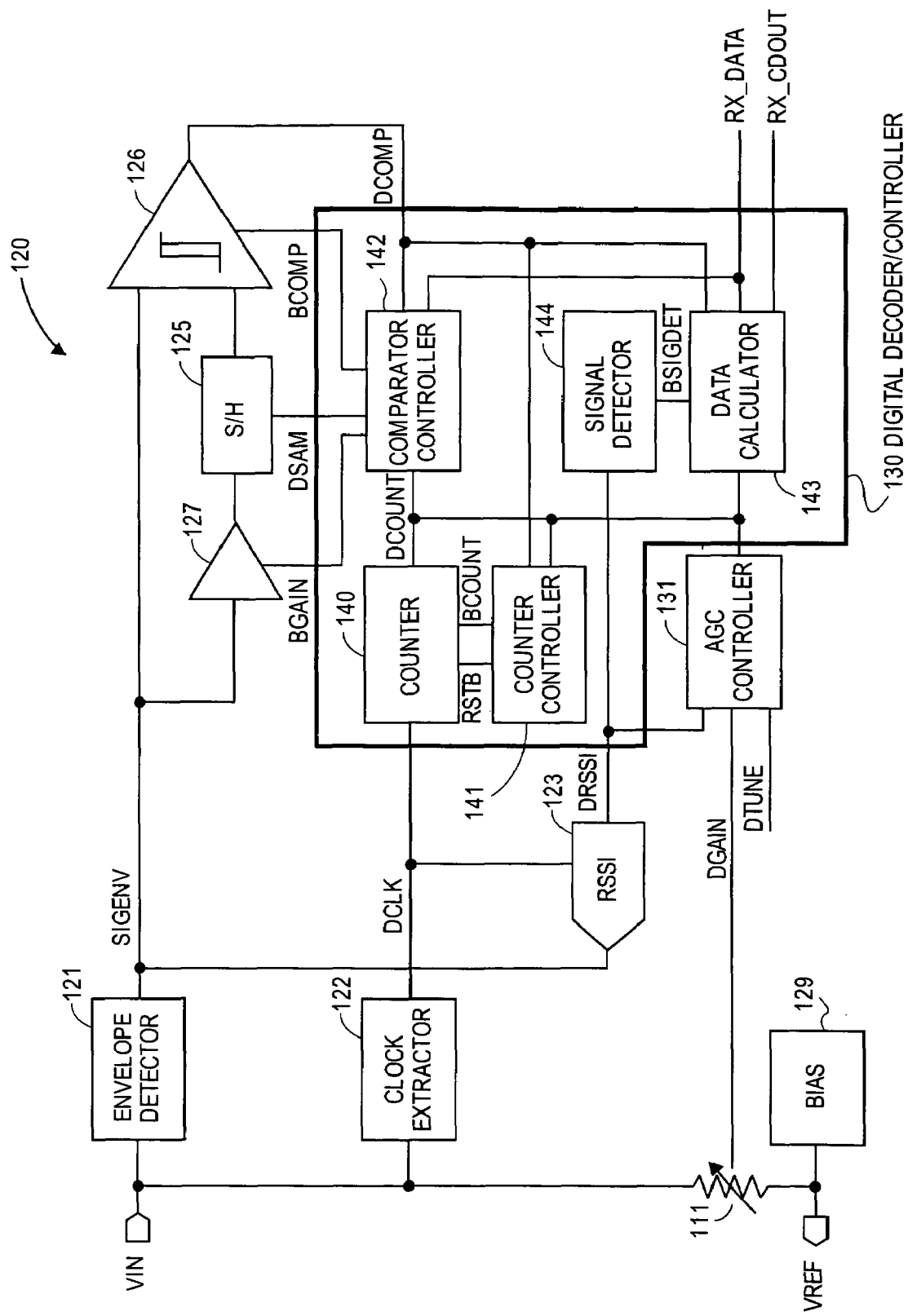
FIG. 8 is a block schematic diagram of one embodiment of the receiver of FIG. 7, in which more detailed features of a digital decoder/controller are shown.

FIG. 8 shows a more detailed embodiment for RX unit 120. Tag RX unit 120 comprises an analog front end which is coupled to a digital decoder/controller 130. The analog front end includes the aforementioned attenuator (resistors 107, 111), an envelope detector 121, a clock extractor 122, a received signal strength indicator (RSSI) 123 for AGC, and a pulse/level detector comprised of a comparator 126 with programmable offset and hysteresis and a sample and hold (S/H) circuit 125. An amplifier 127 with programmable gain may be included as well.

The signal developed across resistor 111 is coupled into envelope detector 121, which then extracts the envelope of the signal and removes the carrier signal. The output of envelope detector 121 is shown as SIGENV. Clock extractor 122 in the particular embodiment is a comparator which extracts the digital clock signal DCLK from the received carrier signal and removes its envelope. The clock signal DCLK is commonly referred to as the field clock. A comparator 126 and a S/H circuit 125, operating at a divided clock, form a pulse/level detector to compare the present envelope signal to a previous envelope sample. This approach provides an adaptive detection threshold and avoids the use of a low-pass filter with a very large RC constant that is typically encountered in conventional edge detectors. S/H circuit 125 may be made to have programmable gain, through the use of programmable gain amplifier 127, so that the threshold may be set according to different RFID protocols.

Digital decoder/controller 130 operates from the field clock signal DCLK from clock extractor 122. Digital decoder/controller 130 also receives the output DCOMP of comparator 126 and sends a sampling clock signal DSAM, which is divided from DCLK, to S/H circuit 125. Digital decoder/controller 130 is also coupled to an AGC controller, as well as outputting various signals, including DCOMP, DCLK, RX_DATA and RX_CDOUT.

FIG. 8 also shows one embodiment for implementing digital decoder/controller 130. A counter 140 receives the clock signal DCLK and provides timing for other blocks as shown in FIG. 8. A counter controller 141 sends a reset signal RSTB to counter 140 once a pulse is detected by comparator 126. A comparator controller 142 controls the pulse/level detector circuitry by sending the sampling clock DSAM to S/H circuit 125. DSAM is generally divided from the field clock DCLK and has a low duty cycle. Comparator controller 142 also controls offset and hysteresis settings of comparator 126 via digital signal BCOMP based on RFID protocols and signal strength. A data calculator 143 determines received data based on counter 140 output DCOUNT and the pulse/level detection output DCOMP from comparator 126. Data calculator generates the data output RX_DATA. Furthermore, because DCLK is not in synchronization with the chip clock, data calculator 143 also generates a data clock signal RX_CDOUT to communicate with a host or any other circuit coupled to RX unit 120.

An AGC loop includes envelope detector 121, RSSI unit 123, AGC controller 131 and the programmable attenuator at the input. AGC controller 131 is driven by a divided clock from counter 140 (which may be the same clock as DSAM), thereby avoiding the use of large capacitors. The AGC output DGAIN is utilized to adjust resistor 111 for input attenuation (gain) and the output DTUNE may be used to select tuning capacitors 102 for coil tuning of the antenna circuit at the receiver input.

Digital decoder/controller 130 also includes a signal detector 144. Signal detection is provided by envelope detector 121, RSSI unit 123 and signal detector 144. If the SIGENV level is below a minimum threshold, signal DSIGDET from signal detector 144 turns off data calculator 143 to prevent data error. Alternatively, when SIGENV is sufficiently strong and above the threshold, DSIGDET activates data calculator 143. The threshold of signal detection may be made programmable, so that the range of operation may be controlled.

Referring again to FIG. 7, RFID tag 100 also has a transmitter (TX) unit 140, that includes a modulation generator 141 and an output driver 142. TX unit 140 may reside on chip, but the output of driver 142 is coupled to drive the load modulation transistor 105, which is typically located off-chip to withstand high voltage. Modulation generator 141 receives the digital data to be transmitted, TX_DATA, and provides encoding and modulation for transmission from coil 101. The output driver may re-synchronize the modulated data DTX with local field clock signal DCLK to minimize jitter in the output signal.

As noted in FIG. 7, a resistive load or a capacitive load may be selected for the load modulation. The selection may be programmable in some embodiments. Other embodiments may have one or the other component only. Accordingly, modulated output data is transmitted from tag coil 101 of the antenna circuit for reception by a RFID reader, such as reader 11 of FIG. 1.

Furthermore, tag 100 may have additional digital circuitry to process the RX_DATA and also to generate the TX_DATA. Also, another device, host, network or system may be coupled to the tag in some embodiments. The use of digital control allows tag 100 to be programmed so that tag 100 may be responsive to more than one RFID protocol. Such flexibility allows one tag design to be used across a plurality of RFID and communication protocols.

Figure 9:
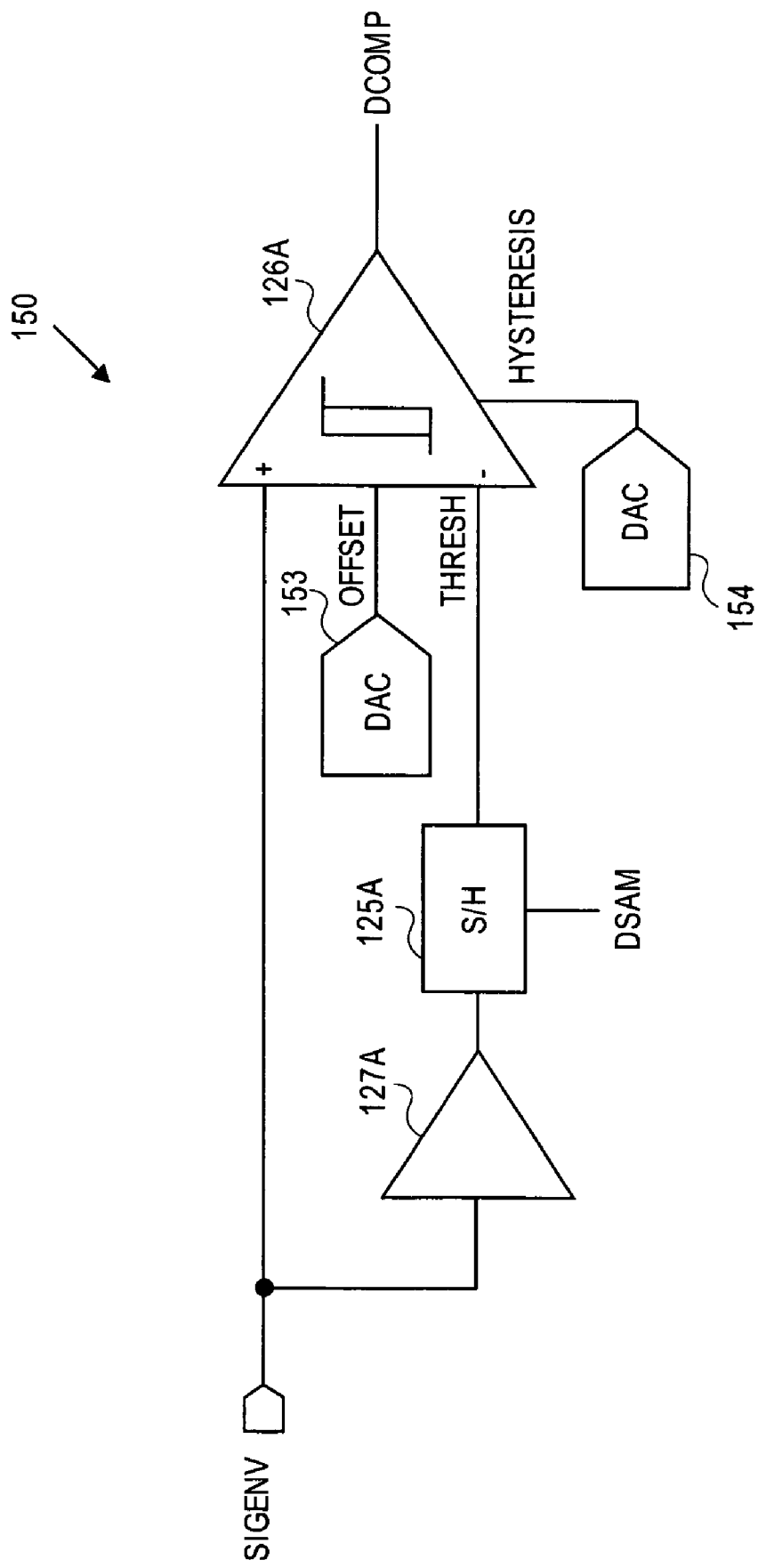
FIG. 9 is a circuit schematic diagram showing one embodiment of a pulse/level detector, including an analog comparator and a sample and hold circuit, employed in the receiver of FIG. 7.
Figure 10:
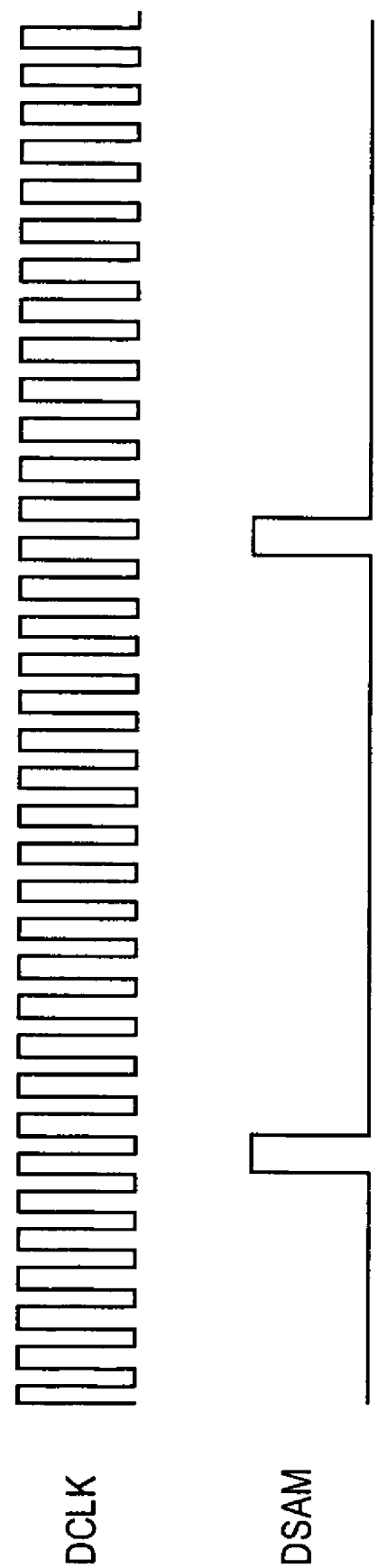
FIG. 10 is one embodiment of a timing diagram for the sample and hold circuit used in the pulse/level detector of FIG. 9.

FIG. 9 illustrates a detailed pulse/level detector circuit 150 that may be utilized as one embodiment to be implemented in RX unit 120 of FIGS. 7 and 8. Detector 150 receives the SIGENV signal and couples the SIGENV signal to amplifier 127A (which is equivalent to amplifier 127) and to the "+" input of data comparator 126A (which is equivalent to comparator 126). A sample and hold circuit 125A with switched capacitors samples the SIGENV signal periodically and couples the sampled SIGENV signal to the "−" input of comparator 126A. The S/H operation is clocked by a low-duty-cycle clock DSAM divided from field clock DCLK. FIG. 10 illustrates the timing relationship between DSAM and DCLK. Comparator 126A has programmable offset and hysteresis, and corresponding control signals are converted by two DACs 153, 154 and applied to comparator 126A. Comparator 126A is used as a core component of data detection for the RX unit.

The particular S/H circuitry of FIG. 9 provides adaptive threshold control for data detection where the detection threshold is adjusted automatically according to the signal strength. The offset and hysteresis of comparator 126A may be controlled accurately by DACs 153, 154 according to RFID protocols and received signal strength. Typically, RFID protocols use two basic encoding schemes, which are pulse density modulation and non-return-to-zero coding. Pulse detection is employed for pulse density modulation and level detection is employed for non-return-to-zero coded data. For pulse density modulated data detection, the S/H circuit stops sampling during a negative pulse of SIGENV. For non-return-to-zero coded data detection, the S/H circuit keeps sampling during the level change.

Since the output SIGENV from envelope detector 121 may contain residual ripple, hysteresis is used to suppress the ripple and other noise. A negative offset is utilized to detect negative pulses for pulse density modulated data. Non-return-to-zero data detection requires a zero offset with a relatively large hysteresis. As noted, the offset and hysteresis values are programmable by the DAC's.

Figure 11:
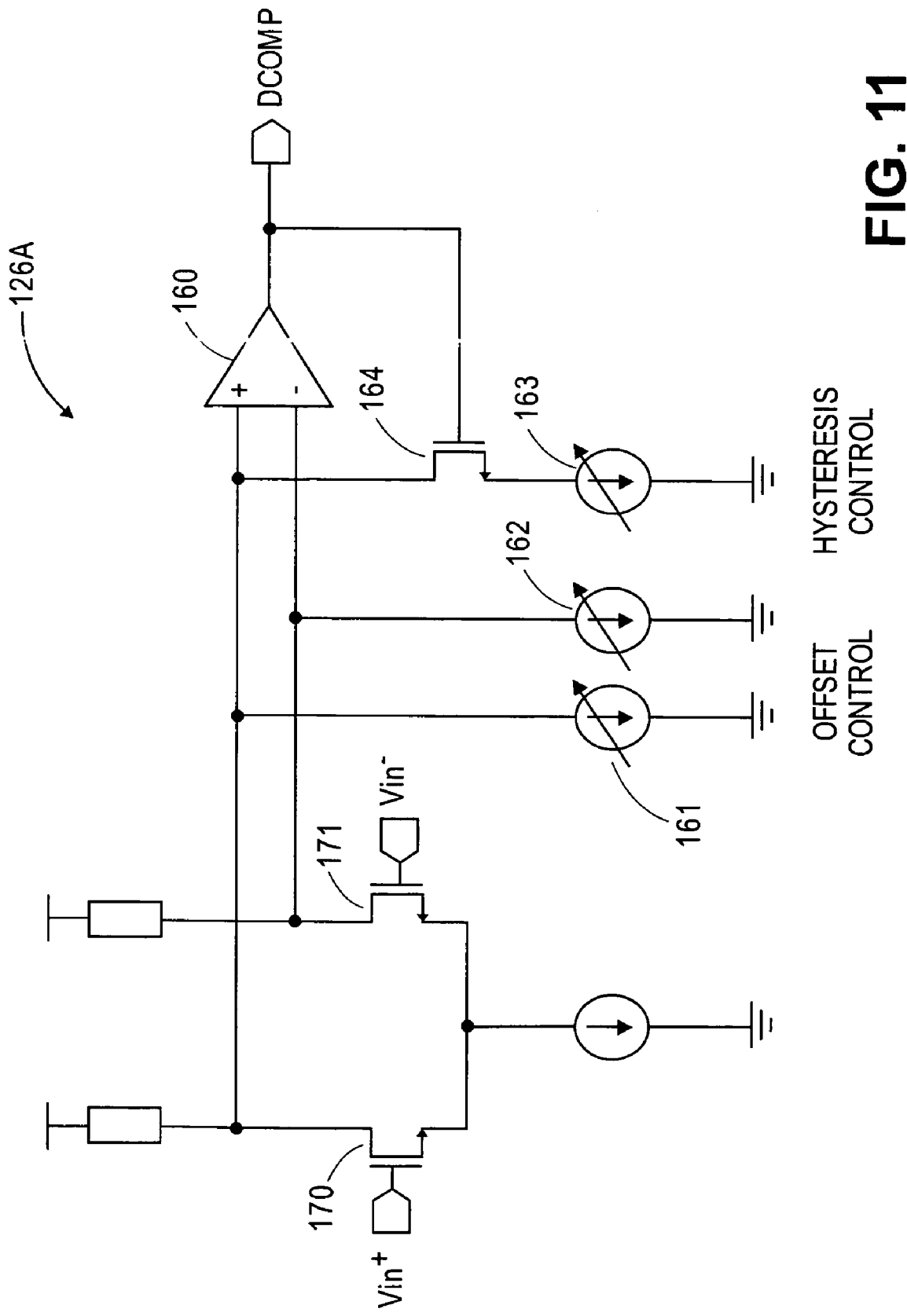
FIG. 11 is a circuit schematic diagram showing one embodiment of the offset and hysteresis control used in the comparator circuit for the receiver of FIG. 7.

FIG. 11 shows one embodiment for implementing the offset control and hysteresis control for comparator 126A of FIG. 9. Comparator 126A includes a differential pair of transistors 170, 171, which act as the pre-amplifier, followed by a comparator 160. Additional current sources 161, 162 coupled to the "+" input and "−" input of comparator 160 are used to set positive or negative offsets by steering the current into the input of the comparator. Another current source 163, which is switched on and off transistor 164, sets the up and down trip points of the hysteresis. The current sources 161, 162, 163 are controlled by corresponding DACs 153, 154 to provide accurate offset and hysteresis control.

Figure 12:
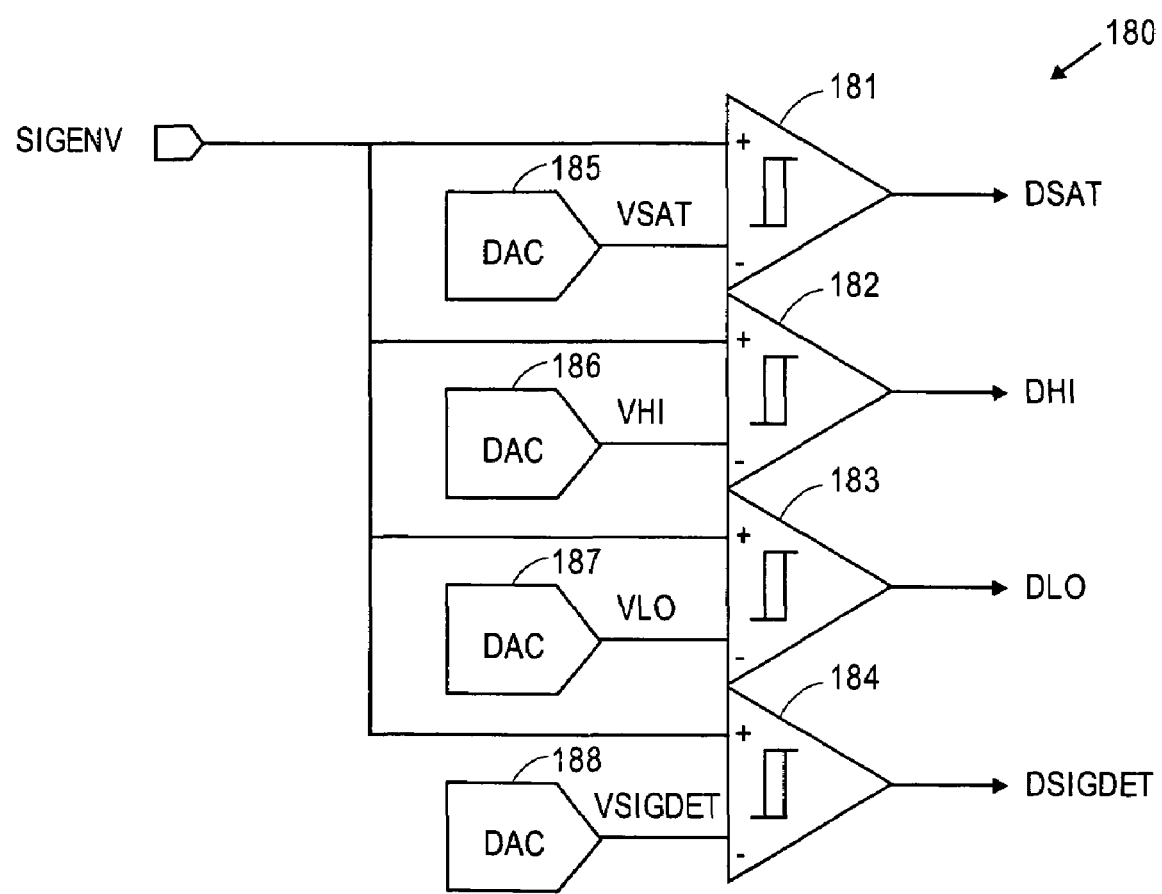
FIG. 12 is a circuit schematic diagram showing one embodiment of the received signal strength indicator (RSSI) block used in the receiver of FIG. 7.

FIG. 12 shows one embodiment of a RSSI circuit 180 to implement the received signal strength indicator (RSSI), such as RSSI 123 of FIGS. 7 and 8, for the AGC. In one embodiment, it is not necessary for the AGC that is used in the RFID transponder to use high-accuracy ADCs. Instead, the AGC only needs to limit the received signal strength within a predetermined range for effective detection. In FIG. 12, the RSSI 180 is comprised of four comparators 181-184 and four digital-to-analog converters (DACs) 185-188. The four DACs set four reference voltages VHI, VLO, VSAT and VSIGDET. VHI and VLO determine the upper and lower limits of the correct signal range. VSAT determines the maximum signal level to prevent saturation. VSIGDET determines the minimum signal level for signal detection.

Comparators 181-184 compare the envelope signal SIGENV to the four reference voltages and generate four output digital signals, DSAT, DHI, DLO and DSIGDET, which provide sufficient signal strength information to the AGC. Some parts of DACs 181-184 may be shared to reduce the area and power of the RSSI 180. Hysteresis comparators may be used to suppress the ripple. However, unlike in the pulse/level detector, no precise hysteresis control is needed.

Thus, various embodiments for a RFID reader transceiver and a RFID transponder (tag) transceiver are described, in which one significant advantage is the ability to program-the reader and/or the tag to accept more than one RFID protocol. Furthermore, digital processing and higher bandwidth in the reader and the tag transceivers also permit more data to be sent and received, as well as permit complex operations (such as secure transactions, coded communication, biometric identification, etc) to be performed using RFID technology. Also, implementing the reader and/or the tag utilizing CMOS technology also allows much of the processing circuitry to operate at lower voltages, which results in lower power consumption.

We claim:

1. An apparatus comprising:
    a transmitter to transmit a radio frequency identification (RFID) signal to a RFID transponder; and
    a receiver to receive a RFID reply signal from the RFID transponder, demodulate the received signal in an analog front end that includes a local oscillator and at least one mixer for demodulation of the received signal, convert the received signal from an analog form into a digital signal, and process the digital signal in a digital back end, in which the digital back end includes a digital signal processor (DSP) to process the digital signal and in which the DSP includes a filter decimator to provide low-pass filtering on an oversampled data stream of the digital signal and decimation to a lower frequency, a band-pass filter to eliminate noise and interference outside a signal bandwidth, a matched filter in combination with a programmable sequence generator that is programmable with protocol-specific sequences to compute correlations between the digital signal and the protocol-specific sequences each corresponding to a particular RFID communication protocol, a power estimator to measure estimation of the correlations, a data slicer to recover data and a collision detector to detect collisions when collisions occur in the data recovery, wherein the transmitter and the receiver, including the DSP, are manufactured on a single complementary metal-oxide semiconductor (CMOS) integrated circuit chip and the matched filter and the programmable sequence generator are programmable to accommodate multiple RFID protocols to be processed by the matched filter.

2. The apparatus of claim 1 wherein the transmitter further includes an analog antenna end and a digital processing end and in which the analog antenna end of the transmitter receives data to be transmitted from the digital processing end and modulates a carrier to transmit the RFID signal.

3. The apparatus of claim 2 wherein the transmitter further includes a digital signal processor in the transmitter digital processing end.

4. The apparatus of claim 1 further including an attenuator at an input of the receiver to attenuate the received signal.

5. The apparatus of claim 4 wherein the attenuator is programmable to change an amount of attenuation of the received signal.

6. A radio frequency identification (RFID) reader receiver comprising:
    an analog front end including a local oscillator and at least one mixer to demodulate an incoming RFID signal;
    an analog-to-digital convener (ADC) to convert the demodulated RFTD signal into a digital signal; and
    a digital back end including a digital signal processor (DSP) to process the digital signal and in which the DSP includes a filter decimator to provide low-pass filtering on an oversampled data stream of the digital signal and decimation to a lower frequency, a band-pass filter to eliminate noise and interference outside a signal bandwidth, a matched filter in combination with a programmable sequence generator that is programmable with protocol-specific sequences to compute correlations between the digital signal and the protocol-specific sequences each corresponding to a particular RFID communication protocol, a power estimator to measure estimation of the correlations, a data slicer to recover data and a collision detector to detect collisions when collisions occur in the data recovery, wherein the analog front end, ADC and the digital back end, including the DSP, are manufactured on a single complementary metal-oxide semiconductor (CMOS) integrated circuit chip and the matched filter and the programmable sequence generator are programmable to accommodate multiple RFID protocols to be processed by the matched filter.

7. The RFID reader of claim 6 further including an attenuator at an input of the analog front end to attenuate the incoming RFID signal.

8. The RFID reader of claim 7 wherein the attenuator is programmable to change an amount of attenuation of the incoming RFJD signal.

9. The RFID reader of claim 6 wherein the analog front end to use direct conversion architecture with quadrature demodulation.

10. The RFID reader of claim 9 wherein the analog front end includes a pair of down-conversion mixers, a pair of band-pass filters and a pair of programmable gain amplifiers.

11. The RFID reader of claim 10 wherein the analog front end includes switched capacitor circuits.

12. The RFID reader of claim 6 wherein the DSP includes a cascaded integrator-comb filter/decimator to provide low-pass filtering of the oversampled data stream from the ADC and to filter and decimate to the lower frequency.

13. The RFID reader of claim 12 further including a finite impulse response filter for the band-pass filter.

14. A method comprising:
    receiving an incoming radio frequency identification (RFID) signal at an analog front end of a RFID reader that includes a local oscillator and at least one mixer for demodulation of the received RFID signal;
    demodulating the received RFID signal by down conversion;
    converting the demodulated RFID signal into a digital signal; and
    processing the digital signal at a back end of the RFID receiver using digital signal processing in a digital signal processor (DSP), in which the DSP includes a filter decimator to provide low-pass filtering on an oversampled data stream of the digital signal and decimation to a lower frequency, a band-pass filter to eliminate noise and interference outside a signal bandwidth, a matched filter in combination with a programmable sequence generator that is programmable with protocol-specific sequences to compute correlations between the digital signal and the protocol-specific sequences each corresponding to a particular RFID communication protocol, a power estimator to measure estimation of the correlations, a data slicer to recover data and a collision detector to detect collisions when collisions occur in the data recovery, wherein the demodulating, convening and processing using DSP are performed by components manufactured on a single complementary metal-oxide semiconductor (CMOS) integrated circuit chip and wherein the matched filter and the programmable sequence generator are programmable to accommodate multiple RFID protocols to be processed by the matched filter.

15. The method of claim 14 further comprising attenuating the incoming RFID signal to make the incoming signal level compatible with CMOS integrated circuit components.

16. The method of claim 14 further including performing an analog signal processing at the analog front end by use of a switched capacitor circuit on a sampled RFID signal.

\* \* \* \* \*